(12) United States Patent
Jacob et al.

(10) Patent No.: US 10,604,097 B1
(45) Date of Patent: *Mar. 31, 2020

(54) DETECTION AND CLASSIFICATION OF EVENTS

(71) Applicant: STATE FARM MUTUAL AUTOMOBILE INSURANCE COMPANY, Bloomington, IL (US)

(72) Inventors: Michael Shawn Jacob, Le Roy, IL (US); Nathan L. Tofte, Downs, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/385,619

(22) Filed: Apr. 16, 2019

Related U.S. Application Data (63) Continuation of application No. 14/936,595, filed on Nov. 9, 2015, now Pat. No. 10,300,876.

(51) Int. Cl.
*B60R 21/0136* (2006.01)
*G07C 5/00* (2006.01)

(52) U.S. Cl.
CPC .......... *B60R 21/0136* (2013.01); *G07C 5/008* (2013.01)

(58) Field of Classification Search
None
See application file for complete search history.

(56) References Cited

U.S. PATENT DOCUMENTS

| 6,076,028 A * | 6/2000 | Donnelly ............... B60R 21/013 701/45 |
| 6,327,528 B1 * | 12/2001 | Vallette ................. B60R 21/013 180/290 |
| 6,517,107 B2 * | 2/2003 | Johnson ............ B60R 21/01536 280/735 |
| 6,557,889 B2 * | 5/2003 | Breed ...................... B60J 10/00 280/735 |

(Continued)

FOREIGN PATENT DOCUMENTS

EP 3279897 A1 * 2/2018

*Primary Examiner* — Steven Lim
*Assistant Examiner* — Muhammad Adnan
(74) *Attorney, Agent, or Firm* — Marshall, Gerstein & Borun LLP (57) ABSTRACT

Systems and approaches for detecting an event, such as a crash involving a motorized and/or non-motorized vehicle, are described. In one approach, a listening component of a mobile computing device is first activated. This listening component may then monitor the sound proximate thereto (e.g., within the vehicle in which the mobile computing device is disposed). Using one or more processors, an audio source may be detected which was generated by an event (such as, for example, a crash involving the vehicle and/or an alerting triggering phrase) and was sensed by the listening component. Using an audio recognition technique, the detected audio source is processed to determine a severity of the event which generated the audio signal. This detection step may include identifying a type and magnitude of the detected audio signal using audio signal identification data. An information signal based on the severity of the event is then transmitted.

20 Claims, 4 Drawing Sheets

(56) References Cited

U.S. PATENT DOCUMENTS

| | | | | |
|---|---|---|---|---|
| 7,177,397 B2* | 2/2007 | McCalmont | | H04M 3/42 379/45 |
| 7,693,720 B2* | 4/2010 | Kennewick | | G06F 16/3329 704/275 |
| 7,832,762 B2* | 11/2010 | Breed | | B60R 21/013 280/728.1 |
| 8,085,139 B2* | 12/2011 | Kanevsky | | G07C 5/085 340/425.5 |
| 8,437,733 B2* | 5/2013 | Yang | | G08B 25/001 455/404.1 |
| 9,628,975 B1* | 4/2017 | Watkins | | H04W 4/90 |
| 9,650,007 B1* | 5/2017 | Snyder | | B60R 21/0132 |
| 9,685,064 B2* | 6/2017 | Boyina | | G08B 25/016 |
| 9,969,344 B1* | 5/2018 | Kolasi ski | | B60R 21/01516 |
| 10,049,654 B1* | 8/2018 | Wheeler | | G10K 15/04 |
| 10,246,037 B1* | 4/2019 | Shea | | B60R 21/0132 |
| 10,308,225 B2* | 6/2019 | Wheeler | | B60S 1/0822 |
| 10,455,396 B2* | 10/2019 | Corley | | H04W 4/90 |
| 10,462,567 B2* | 10/2019 | Amman | | H04R 29/004 |
| 2005/0030224 A1* | 2/2005 | Koch | | G01S 5/0027 342/357.31 |
| 2005/0109075 A1* | 5/2005 | Kithil | | G01L 1/16 73/12.09 |
| 2006/0011399 A1* | 1/2006 | Brockway | | A61B 5/18 180/272 |
| 2009/0099732 A1* | 4/2009 | Pisz | | G01C 21/20 701/45 |
| 2009/0248283 A1* | 10/2009 | Bicego, Jr. | | G01C 21/3691 701/117 |
| 2010/0112945 A1* | 5/2010 | Hanif | | H04L 12/2816 455/41.2 |
| 2010/0219944 A1* | 9/2010 | McCormick | | G07C 5/008 340/436 |
| 2010/0283609 A1* | 11/2010 | Renner | | G08B 25/016 340/541 |
| 2011/0096912 A1* | 4/2011 | Stahlin | | G08B 25/002 379/39 |
| 2011/0195758 A1* | 8/2011 | Damale | | H04M 1/6075 455/569.1 |
| 2011/0201302 A1* | 8/2011 | Hatton | | G08G 1/205 455/404.2 |
| 2012/0194332 A1* | 8/2012 | Lakshmanaperumal | | B60Q 5/00 340/438 |
| 2012/0280836 A1* | 11/2012 | Roesner | | G08G 1/0175 340/932.2 |
| 2013/0100268 A1* | 4/2013 | Mihailidis | | G08B 21/02 348/77 |
| 2013/0332026 A1* | 12/2013 | McKown | | B60R 21/013 701/33.7 |
| 2014/0012460 A1* | 1/2014 | Kleinschmidt | | G06Q 10/20 701/31.5 |
| 2014/0218187 A1* | 8/2014 | Chun | | G08B 21/04 340/439 |
| 2015/0145662 A1* | 5/2015 | Barfield, Jr. | | G08B 25/016 340/436 |
| 2015/0317801 A1* | 11/2015 | Bentley | | H04N 7/181 382/107 |
| 2016/0093212 A1* | 3/2016 | Barfield, Jr. | | H04N 7/185 348/144 |
| 2016/0094964 A1* | 3/2016 | Barfield, Jr. | | H04Q 9/00 455/404.2 |
| 2017/0124835 A1* | 5/2017 | Boyina | | G08B 21/0461 |

* cited by examiner

DETECTION AND CLASSIFICATION OF EVENTS

CROSS REFERENCE TO RELATED APPLICATIONS

This application claims the benefit of U.S. patent application Ser. No. 14/936,595, filed on Nov. 11, 2015, the entirety of which is herein expressly incorporated by reference.

FIELD OF THE DISCLOSURE

The present disclosure generally relates to event detection and, more particularly, to systems and approaches for detecting the occurrence of an event using an activated listening module.

BACKGROUND

When traveling in an automobile, a number of events and incidents may occur concerning the vehicle and/or its occupants. For example, the vehicle may be involved in an accident in which occupants may incur injuries and thus may require medical assistance. Similarly, in some instances, the vehicle may become inoperable and require a tow truck to relocate it as necessary. Due to the severity of the incident, occupants may have difficulty contacting various forms of roadside assistance.

Vehicle manufacturers have integrated on-board sensors which monitor a number of aspects of the vehicle and/or its occupants. As an example, a sensor such as an accelerometer may monitor gravitational forces, movement, and/or vibrations of the vehicle. Other sensors may be implemented to monitor the occupancy of one or more seats within the vehicle, such as whether a seatbelt has been fastened and/or whether the weight situated atop the seat is sufficient to deploy a safety component such as an airbag or other device associated with the seat in the event a crash occurs.

These sensors are secured to the vehicle and are essentially confined to operate solely with the particular vehicle. As a result, a user is not able to transport a sensor or systems installed in one vehicle into another vehicle such as, for example, a rental vehicle. Additionally, these devices do not allow the sensors to be modified to preform additional functionality (e.g., adapting a "crash" sensor to monitor the presence of barriers and the like). Furthermore, the operation of these systems and devices generally employ unique, proprietary codes and as a result, their use is often dependent upon each vehicle manufacturer. An individual desiring to enhance the safety system or systems of their vehicle may find it difficult, and oftentimes impossible, to integrate additional sensors which are not compatible with their particular vehicle's manufacturer due to this proprietary language.

BRIEF DESCRIPTION OF THE DRAWINGS

The above needs are at least partially met through provision of the detection and classification of events described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

To increase the capability of a vehicle's safety system, a portable audible sensor is described herein. The portable audible sensor may be used with motorized and non-motorized vehicles, for example automobiles, bicycles, electric vehicles, organic transit type vehicles, and the like, as well as with pedestrian travel. This audible sensor is capable of being integrated on a mobile computing device, such as, for example a smartphone, and may work in numerous situations and environments. For example, various modes such as a vehicle, lodging, and/or environment modes may be provided in which the systems and approaches described herein may be adapted to detect the presence of particular events.

In many of these approaches, the audible sensor is adapted to monitor or "listen" for the presence of various sounds which may be representative of the presence of a vehicular crash or another designated event such as deforming metal, breaking glass, skidding tires, hail, listening for alerting verbal phrases such as "oh no," "look out," "hang on," expletives, and the like, and may also be based on the decibel level of the triggering phrase in addition to the actual phrase. Other examples are possible. Upon the detection of such a designated event, the system may make an inquiry into the well-being of the user. As a result of this inquiry, appropriate action may be taken to assist the user.

Generally speaking, pursuant to these various embodiments, systems and approaches for detecting an event, such as a crash involving a vehicle, are described. In one approach, a listening component of a mobile computing device is first activated. This listening component may then monitor the sound proximate thereto (e.g., within the vehicle in which the mobile computing device is disposed). Using one or more processors, an audio source may be detected which was generated by an event (such as, for example, a crash involving the vehicle) and was sensed by the listening component. Using an audio recognition technique, the detected audio source is processed to determine a severity of the event which generated the audio signal. This detection step may include identifying a type and magnitude of the detected audio signal using audio signal identification data. An information signal based on the severity of the event is then transmitted.

So configured, users are provided with a device that may be used in various vehicles and other environments and do not require the use of vehicles having advanced safety and security features installed thereon. Furthermore, the user may utilize an existing mobile computing device (e.g., a cellular telephone and/or a tablet) and thus may not need to purchase any additional hardware components. Due to the system's ability to consume low amounts of energy while activated in the listening mode, the system may be used in an "always-on" operation.

Figure 1:
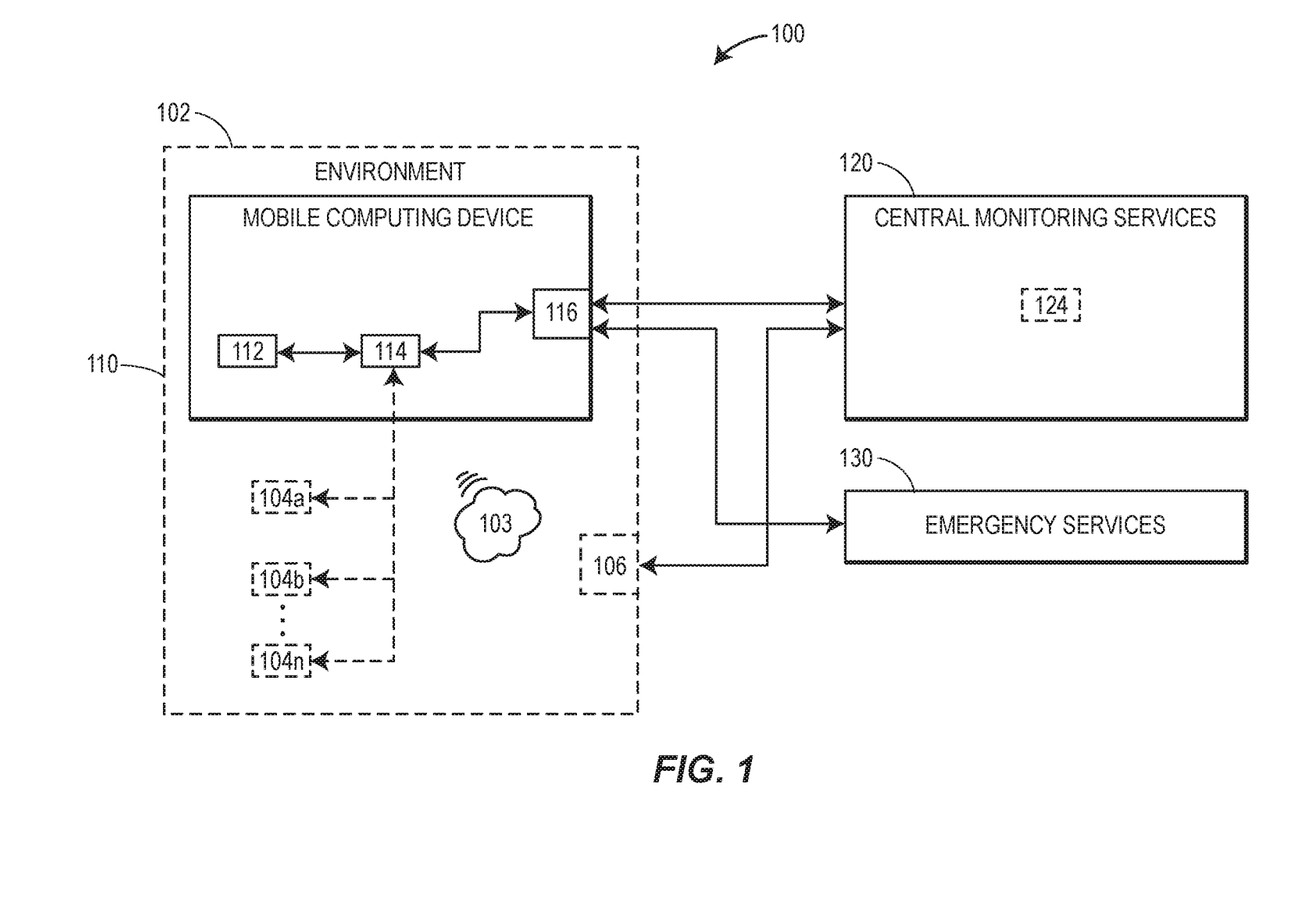
FIG. 1 comprises a block diagram of an exemplary system for detecting an event in accordance with various embodiments.

Referring now to the drawings, and in particular to FIG. 1, a system 100 for detecting an event may include an environment 102, a mobile computing device 110 at least partially disposed within the environment, a central monitoring service 120, and emergency services 130.

The environment 102 may have any number of sensors 104, any number of audio signals 103, as well as a communication device 106. In some examples, the environment 102 includes a vehicle, and thus the mobile computing device 110 may be disposed therein. In these examples in which the environment includes a vehicle, the sensors 104 may include any type of sensor used in a vehicle, such as, for example, accelerometers, gyroscopes, crash/impact sensors, global positioning devices, and the like. Other examples of sensors 104 are possible.

The audio signal 103 may be any type of audio signal generated in the environment 102. For example, when the environment 102 is a vehicle, the audio signal 103 may be in the form of a sound generated by an accident (e.g., the impact between the vehicle and another object, breaking glass, deforming metal, skidding tires and the like). In other examples in which the environment 102 is a vehicle, the audio signal 103 may be in the form of a sound generated when inclement weather contacts the vehicle (e.g., the "thud" sound of hail hitting the vehicle). In other examples, the audio signal 103 may include an alerting triggering phrase such as a verbal sound (e.g., "oh no!", "look out!", "hang on!", expletives, and the like. The decibel level, which relates to the magnitude of the triggering phrase, may be used in addition to the actual content of the triggering phrase to determine the severity of the event. Other examples are possible.

The mobile computing device 110 may be any type of mobile device capable of performing computing functions and transmitting data. In some examples, the mobile computing device 110 includes a listening component 112, a processor 114, an event database 115, and a communication module 116.

The event database 115 is stored in one or more memories, such as RAM, ROM, flash memory, etc. (e.g., within the mobile computing device 110 and/or computing device 124 of the central monitoring service 120). Any information relating to audio signals 103 and/or events and their corresponding characteristics may be stored at the event database 115.

The central monitoring services 120 may be any type of service located remotely from the environment 102 and/or the mobile computing device 110 and may include any number of computing devices and/or processors 124 as well as any number of communications modules (not shown) used to communicate with the environment 102, mobile computing device 110, and/or emergency services 130.

Emergency services 130 may be any well-known service provider which responds to emergencies or events such as, for example, a police and/or a fire department, an ambulance service, a roadside assistance service, a security service, and the like. Other examples are possible.

In operation, the listening component 112 of the mobile computing device 110 is activated and remains in a listening mode to monitor sounds proximate the environment 102 (e.g., the vehicle). During this time, the listening component 112 may receive any number of audio signals 103. The processor 114 may then detect an audio signal 103 which was generated by an event (e.g., a crash) involving the environment 102 (e.g., the vehicle) and process via any type of known audio recognition technique, the detected audio signal 103 to determine a severity of the event (e.g., the crash) which generated the audio signal 103. This processing may include identifying a type and/or magnitude of the detected audio signal 103 using audio signal identification data stored on the processor 114 and/or the event database 115. The mobile computing device 110 may then transmit an information signal based on the determined severity of the event via communication module 116.

It is understood that in some approaches, the processor 114 may "learn" a number of different sounds relating to various events in order to properly determine the type of detected audio signal. This learning process may occur using any number of commonly-known techniques. In one embodiment, any number of audio signals may be programmed at the central monitoring service 120 (e.g., entered by a representative) which identifies the cause of the audio signal. In an embodiment and scenario, any number of the computing devices 124 may be used to create an entry for a new audio signal and to enter an appropriate description for the event (e.g., car crash, broken glass, etc.). Any number of recorded and/or live audio signals may be associated with each type of event. The audio signal may then be processed to generate event identification data indicative of the audio signal, store the event identification data, and associate the event identification data with the corresponding description.

In an example, the system may process the audio signal to identify metrics and/or parameters which uniquely identify the audio signal within the environment 102, such as a tone frequency or frequencies, period or rate of repeated tones, average and/or peak signal strength of the audio signal, harmonics associated with the environment 102 (e.g., engine operating frequencies), and or any other suitable metrics and/or parameters. This information may be used for various purposes, such as, for example, determining a base-line audio signal of the environment 102 in order to accurately detect the presence of particular events. In other examples, more complex algorithms may be used to generate an identifier from the audio signal waveform, and identifying data may then be stored and associated with the event description. In yet other examples, techniques similar to those currently used for song recognition (e.g., in smartphone applications) may be used to generate data indicative of the audio signal. Other examples are possible. This process may be repeated for any number of possible events in which monitoring is desired.

The identifying information and/or data for these different types of sounds may be stored centrally on a memory component of the mobile computing device 110 (e.g., the event database 115) or alternatively may be stored on a data server or other electronic device located remotely from the mobile computing device 110. One example of such a location is at the computing device 124 of the central monitoring service 120. It is understood that in some examples, all or a portion of the event database 115 may be located and/or saved at the central monitoring service 120.

In an embodiment, this information signal is transmitted to the central monitoring service 120. Upon receiving the information signal, the central monitoring service 120 may process the signal and determine an appropriate action. For example, in embodiments in which the environment 102 is a vehicle, the signal may contain information relating to a crash and its corresponding severity. Based on this information, the central monitoring service 120 may choose to transmit a communication to the mobile computing device to inquire as to whether a user needs assistance. This communication may be in the form of a telephone call via a cellular or any other network, a message sent via a messaging system (e.g., a text message), and/or any type of communication displayed via an application and/or program installed on the mobile computing device 110. Other examples are possible. In some forms, the mobile computing device 110 may generate a confirmation and/or request to transmit the information signal prior to transmission.

The communication from the central monitoring service 120 may vary based on the severity of the detected event. For example, if the event (e.g., a crash) is determined to be minor, the communication may simply be a call in which the user may respond. However, if the severity is determined to be high, the communication may require the user to respond. In some of these examples, if the user does not respond within a specified time, further action may be taken to ensure safety of the user. As an example, in the event of a severe crash, the user may be temporarily incapacitated and thus may not immediately respond to inquiries. The central monitoring service 120 may contact the appropriate emergency service 130 upon a predetermined time frame elapsing, and in response, the emergency service 130 may take an appropriate action.

In other embodiments, based on the severity of the event, the mobile computing device 110 and/or the central monitoring service 120 may directly contact an appropriate emergency service 130. Further, in some embodiments, when the environment 102 includes a communication device 106, the central monitoring service 120 may attempt to contact the environment 102 in addition to and/or as an alternative to communicating via the mobile computing device 110. For example, in vehicular environments equipped with direct communication capabilities (e.g., a voice communications network), the central monitoring service 120 may communicate directly with the vehicle to inquire into the user's well-being. Other examples are possible.

It is understood that components of the environment 102, the mobile computing device 110, the central monitoring service 120, and/or the emergency service 130 may communicate via any number of wired and/or wireless communication protocols, such as, for example, Wi-Fi, Bluetooth, 3G/4G LTE network communications, Ethernet and/or serial port connections, and/or any other network communication protocols.

In some examples, the processor 114 may also monitor operation of the environment (e.g., a vehicle) by using sensed data obtained from the sensors 104 via any number of communication protocols. The processor 114 may also detect an operating characteristic of the environment 102. The audio signal identification data may be associated with this detected operating characteristic of the environment 102. As an example, in the event of a vehicular crash, the detected operating characteristic may indicate that the vehicle rapidly reduced speed. This information, when paired with the audio signal identification data, may be used by the processer 114 to assist in determining the severity of the event. In other approaches, information pertaining to the deployment of airbags may be paired with the audio signal identification data. Other examples are possible.

In some embodiments, when an event is detected, the surrounding information (e.g., sound and/or light measurements, to name a few) are transmitted to the central monitoring service 120. Further, information relating to the presence of wireless networks such as Wi-Fi, Bluetooth, NFC, and the like may also be transmitted to the central monitoring service 120. This information regarding nearby devices may assist in identifying other passengers and/or perpetrators in an incident. In some embodiments, the central monitoring service 120 may send a message to other nearby devices that are in the vicinity regardless of the device owner's affiliation with the originating source. This message may be used as a distress alert and/or a warning.

As an example, in the event of a house break-in, if a user proclaimed "who are you?", the device may be triggered to record the conversation and notify central monitoring. A new Wi-Fi identifying address (e.g., a mac address) may be automatically detected by the device, and the information may be sent to the central monitoring service 120. This information may be cross-referenced to a phone registered with a particular number, and the central monitoring service 120 may then automatically send a message and/or call this number to inform the user that they have been identified as being in the vicinity of a distressed person and their interactions are being recorded. This communication may change based on what is determined from the alert information received by the central monitoring service 120. In one example, if the alerting sound and/or speech was indicative of an intruder, the message sent to the nearby person may be a warning advising the person not to proceed. In other examples, if the alert pertains to a medical event, the message sent to the nearby person may include care information such as, for example, blood type, known illnesses, and the like. The transmission of this information may be dependent on other factors such as authorization, whether the nearby person is registered in a particular occupation (e.g., a police officer, medical professional, etc.) and the like. Other examples are possible.

In some examples, a change in environmental conditions such as ambient light and/or air pressure may trigger a more detailed sound detection. Based on the varying amount of audible detail received, performance characteristics (such as, for example, battery life) of the device may be improved during continuous monitoring and/or any other modes of operation. In one example, air pressure and ambient light may change due to the opening of a vehicle door. Other examples are possible.

Figure 2:
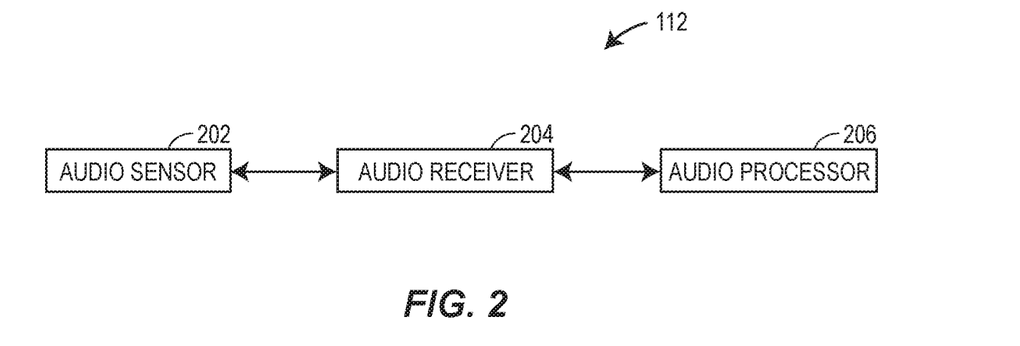
FIG. 2 comprises a block diagram of an exemplary listening component in the system of FIG. 1 in accordance with various embodiments.

Turning to FIGS. 1 and 2, the listening component 112 may include components such as an audio sensor 202, an audio receiver 204, an audio processor 206, and a database 208. The audio sensor 202 may be a microphone, a group or array of two or more directional microphones, or similar device capable of receiving analog and/or digital audio signals. The audio receiver 204 is coupled to the audio sensor 202 and may include any number of components such as, for example, analog amplifiers and/or filters, analog-to-digital converters which may convert analog audio signals detected by the audio sensor 202 to digital audio signals, and/or digital buffers and/or filters which operate on the converted signals. In some approaches, the audio receiver may further be adapted to obtain metrics associated with received audio signals such as, for example, signal strength, frequency, multi-path delay information, and/or directionality, among others. These metrics may then be used to characterize audio signals from various environments 102.

The audio processor 206 is coupled to the audio receiver 204 and may include any number of physical processors which execute software and/or firmware instructions stored in a memory, such as random access memory (RAM) or read-only memory (ROM), for example. The audio processor 206 processes audio signals received via audio sensor 102 and audio receiver 104 using an audio recognition or other learning technique described herein in order to perform various operations of event detection. For example, the audio processor 206 may be configured to set up and/or configure any number of features relating to the audio signals in a particular environment 102. Further, the audio processor 206 may process audio signals 103 when a listening mode has been activated to determine whether the present, detected audio signals are sufficiently different than the ambient noise profile to warrant a communication to/from the central monitoring service 120. It is understood that the audio processor may be a standalone component, or may be partially and/or entirely incorporated into the processor 114.

It will be understood that in many examples, any number of components in the listening device 112 may be located within the mobile computing device 110. In other examples, any or all of these components may be located remotely from the mobile computing device 110. In further examples, any and/or all of these components may be located at the central monitoring service 120. Other examples are possible.

Figure 3:
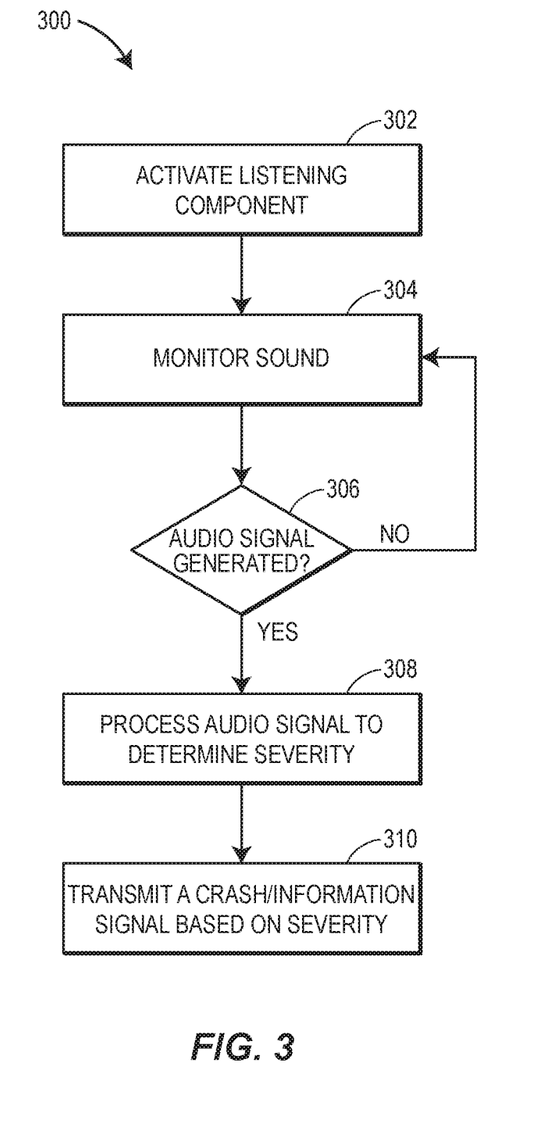
FIG. 3 comprises a flow diagram of an exemplary approach for detecting an event in accordance with various embodiments.

Turning to FIG. 3, a method 300 for detecting an event in an environment is described. First, a listening component and/or module of a mobile computing device is activated via at least one processor (block 302). In an embodiment, the listening component includes an operating mode. It is understood that the listening component may have other modes such as, for example, a learning mode, a test mode, and the like. Next, the one or more processors monitor sound proximate the mobile computing device (block 304). It is then determined whether an audio signal generated by an event and sensed by the listening component is detected via the one or more processors (block 306). If an audio signal was not detected, the method 300 returns to block 304. If an audio signal was generated, the method 300 proceeds to process the audio signal via the one or more processors to determine the severity of the corresponding event related to the audio signal (block 308). The step of processing may use any known audio recognition technique and may include identifying a type and magnitude of the detected audio signal using audio signal identification data based on the operating mode of the listening module. An event information signal is then transmitted via one or more processors (block 310). This event information signal is based on the identified type and magnitude of the detected audio signal.

In an example, the operating mode may be selected from at least one of a vehicle context, an environmental context (e.g., walking in a city), and a lodging context (e.g., a hotel and/or a residence). Other examples of operating modes are possible. In some approaches, the operating environment may be detected via the one or more processors. Further, the operating mode may be automatically configured based on the detected operating environment. Detecting the operating environment may occur via the utilization of a positioning device which may detect movement and/or location of the mobile computing device. In some examples, this positioning device may include a global positioning system (GPS) or any other similar system. In other examples, a Wi-Fi network may be used to detect the operating environment of the listening component. It is understood that other techniques such as the use of radio frequency identification (RFID) and the like may also be used to detect the operating environment.

The step 310 of transmitting the event information signal may include emitting an audible sound from the mobile computing device based on the detected operating environment of the listening component. For example, the audible sound may be used as an alarm to deter trespassers from approaching the user. Other examples are possible.

The step 310 of transmitting the event information signal may further include transmitting the event information signal to a central service and/or an emergency service based on the detected operating environment of the listening component. Further, contact information associated with the user may be transmitted to a repair center to expedite the repair process. Depending on the environment and the event, additional information may be sent to other providers in order to provide assistance to the user.

Figure 4:
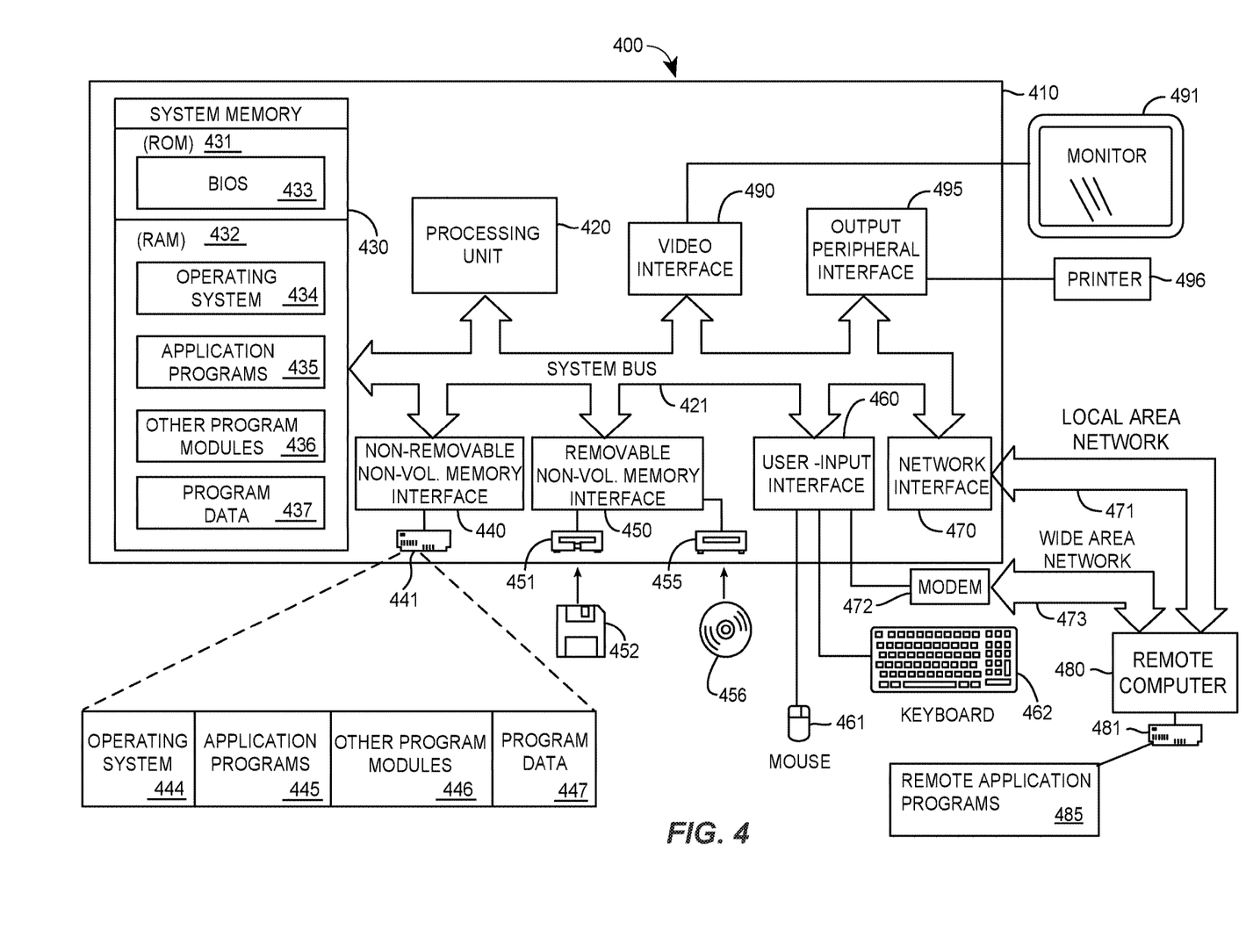
FIG. 4 comprises a block diagram of an exemplary computer system on which an approach for detecting an event may operate in accordance with various embodiments.

Turning to FIG. 4, an exemplary computer system 400 in which an approach for detecting the presence of an event and taking appropriate subsequent action in accordance with the described embodiments is provided. It is understood that the computer system 400 may be a more detailed description of the mobile computing device 110 as described in FIGS. 1 & 2. The computer system 400 of FIG. 4 includes a computing device in the form of a computer 410. Components of the computer 410 may include, but are not limited to, a processing unit 420, a system memory 430, and a system bus 421 that couples various system components, including the system memory to the processing unit 420. The system bus 421 may be any of several types of bus structures including a memory bus or memory controller, a peripheral bus, and a local bus using any of a variety of bus architectures. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The computer 410 typically includes a variety of computer-readable media. Computer-readable media can be any available media that can be accessed by computer 410 and includes both volatile and nonvolatile media, and both removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above are also included within the scope of computer-readable media.

The system memory 430 includes computer storage media in the form of volatile and/or nonvolatile memory such as ROM 431 and RAM 432. A basic input/output system 433 (BIOS), containing the basic routines that help to transfer information between elements within the computer 410, such as during start-up, is typically stored in ROM 431. RAM 432 typically contains data and/or program modules that are immediately accessible to and/or presently being operated on by the processing unit 420. By way of example, and not limitation, FIG. 4 illustrates operating system 434, application programs 435, other program modules 436, and program data 437.

The computer 410 may also include other removable/non-removable, volatile/nonvolatile computer storage media. By way of example, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 221 by a removable memory interface, such as interface 450.

The drives and their associated computer storage media discussed above and illustrated in FIG. 4 provide storage of computer-readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer 410 through input devices such as a keyboard 462 and cursor control device 461, commonly referred to as a mouse, trackball or touch pad. A monitor 491 or other type of display device is also connected to the system bus 221 via an interface, such as a graphics controller 490. In addition to the monitor, computers may also include other peripheral output devices such as printer 496, which may be connected through an output peripheral interface 495.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include a local area network (LAN) 471 and a wide area network (WAN) 473, but may also include other networks. Such networking environments are commonplace in hospitals, offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the input interface 460, or other appropriate mechanism. In a networked environment, program modules depicted relative to the computer 410, or portions thereof, may be stored in the remote memory storage device 481. By way of example, and not limitation, FIG. 4 illustrates remote application programs 485 as residing on memory device 481.

The communications connections 470, 472 allow the device to communicate with other devices. The communications connections 470, 472 are an example of communication media, as discussed above.

Any of the methods of detecting an event relating to an environment and generating a transmission and/or notifying a monitoring and/or emergency service that an event has occurred that are described above may be implemented in part, or in their entirety, using one or more computer systems such as the computer system 400 illustrated in FIG. 4. For example, audio signals may be detected during training and/or operating modes, as described above, by an audio sensor (e.g., microphone(s)) of the computer 410, or by an audio sensor of each of one or more devices coupled to the computer 410 (e.g., coupled to system bus 421 via a peripheral interface not shown in FIG. 4), and/or alarm description data may be entered via the keyboard 462 (and/or mouse 461) and user input interface 460. As another example, the processing unit 420 may cause the network interface 470 to send a notification/alert to a user (in the manner described above) via the WAN 473, LAN 471, and/or one or more other networks.

Some or all calculations performed in the embodiments described above (e.g., calculations for determining whether an audio signal corresponds to a known event, calculations for determining a difference between an audio signal and an ambient noise profile of an environment, etc.) may be performed by a computer such as the computer 410, and more specifically may be performed by a processor such as the processing unit 420, for example. The processing unit 420 (or a peripheral device coupled to system bus 421 via a peripheral interface, such as a USB interface) may implement the functions of audio processor 204 described above in connection with FIGS. 1 and 2 and the operations of approach 300 of FIG. 3, for example. In some embodiments, some calculations may be performed by a first computer such as the computer 410 while other calculations may be performed by one or more other computers such as the remote computer 480. The calculations may be performed according to instructions that are part of a program such as the application programs 435, the application programs 445 and/or the remote application programs 485, for example.

It will be understood that the systems and approaches described herein may be used to detect events in any number of different environments 102 via the use of contextual information. For example, using any number of location-based tracking devices, the mobile computing device 110 may determine that the current environment is a hotel room. In this environment, the listening component 112 may be adapted and/or programmed to detect audio signals 103 relating to the jimmying of any type of door (e.g., a hinged and/or a sliding door) to act as a security protocol to protect users against unwanted entry into their hotel room. As previously described, in some examples, the processor 114 may inquire into the well-being of the user and/or may automatically transmit a signal to the central monitoring service 120 and/or the emergency service 130. In further examples, the mobile computing device 110 may be programmed to detect particular phrases which may be pre-programmed and/or programmed by the user. For example, the mobile computing device 110 may be adapted to detect language such as "what are you doing?" "help!" and/or any other word or phrase desired.

In yet further embodiments, the systems and approaches described herein may be used to determine whether an audio signal was received within a predetermined time. For example, in some environments, the systems and approaches described herein may be used as a confirmation that the user is safe. In these examples, if the mobile computing device 110 does not detect the appropriate audio signal, it may communicate with the central monitoring service 120 and/or the emergency service 130. Other examples are possible.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method of detecting a crash involving a vehicle, the method comprising:
   activating a listening component of a mobile computing device;
   monitoring, at the listening component, sound proximate the vehicle;
   detecting, by one or more processors, an audio signal that was generated by a crash involving the vehicle and sensed by the listening component while monitoring sound proximate the vehicle, the audio signal being in the form of an alerting triggering phrase having a decibel level associated therewith;
   processing, by one or more processors and using an audio recognition technique, the detected audio signal to determine a severity of the crash that was the source of the audio signal, wherein processing the detected audio signal to determine the severity of the crash that was the source of the audio signal includes identifying a type and magnitude of the decibel level of the alerting triggering phrase using audio signal identification data; and
   transmitting, by one or more processors, an event information signal based on the determined severity of the crash.

2. The method of claim 1, further comprising:
   monitoring operation of the vehicle via a sensor; and
   detecting an operating characteristic of the vehicle, wherein the audio signal identification data is associated with the detected operating characteristic of the vehicle.

3. The method of claim 2, wherein monitoring operating of the vehicle via a sensor includes using an accelerometer or a positioning device.

4. The method of claim 1, further comprising requesting confirmation to transmit the crash/information signal prior to transmitting the crash/information signal.

5. The method of claim 1, further comprising:
   transmitting the event information signal to at least one of a central service or an emergency service.

6. The method of claim 1, further comprising automatically transmitting contact information associated with an owner of the damaged vehicle to a repair center.

7. A non-transitory computer-readable storage medium comprising computer-readable instructions to be executed on one or more processors of a system for detecting a crash involving a vehicle, the instructions when executed causing the one or more processors to:
   activate a listening component of a mobile computing device;
   monitor sound proximate the vehicle;
   detect an audio signal that was generated by a crash involving the vehicle and sensed by the listening component while monitoring sound proximate the vehicle, the audio signal being in the form of an alerting triggering phrase having a decibel level associated therewith;
   process the detected audio signal using an audio recognition technique to determine a severity of the crash that was the source of the audio signal, wherein the decibel level of the alerting triggering phrase is used to determine the severity of the crash; and
   cause an event information signal based on the determined severity of the crash to be transmitted.

8. The non-transitory computer readable storage medium of claim 7, wherein the instructions when executed cause the one or more processors to cause the event information signal based on the determined severity of the crash to be transmitted at least by causing an identification of a type and magnitude of the detected audio signal using audio signal identification data.

9. The non-transitory computer readable storage medium of claim 7, wherein the instructions when executed cause the one or more processors to monitor operation of the vehicle via a sensor; and detect an operating characteristic of the vehicle, wherein the audio signal identification data is associated with the detected operating characteristic of the vehicle.

10. The non-transitory computer readable storage medium of claim 9, wherein monitoring operating of the vehicle via a sensor includes using at least one of an accelerometer or a positioning device.

11. The non-transitory computer readable storage medium of claim 7 further comprising requesting confirmation to transmit the event information signal prior to transmitting the event information signal.

12. The non-transitory computer readable storage medium of claim 7, further comprising:
   transmitting the event information signal to at least one of a central service or an emergency service.

13. A computer-implemented method for detecting an event, the method comprising:
   activating, by one or more processors, a listening module of a mobile computing device, the listening component including an operating mode;
   monitoring, by one or more processors, sound proximate the mobile computing device;
   detecting, by one or more processors, an audio signal that was generated by an event and sensed by the listening module while monitoring sound proximate the mobile computing device, wherein the audio signal is in the form of an alerting triggering phrase having a decibel level associated therewith;
   processing, by one or more processors and using an audio recognition technique, the detected audio signal, wherein processing the detected audio signal includes identifying a type and magnitude of the event that was the source of the audio signal using audio signal identification data based on the operating mode of the listening module; and transmitting, by one or more processors, an event information signal based on the identified type and magnitude of the detected audio signal.

14. The computer-implemented method of claim 13, wherein the operating mode of the listening component includes at least one of the following: a vehicle context, an environmental context, or a lodging context.

15. The computer-implemented method of claim 13, further comprising:

detecting, by the one or more processors, an operating environment of the listening component; and automatically configuring the operating mode of the listening component based on the detected operating environment.

16. The computer-implemented method of claim 15, wherein detecting the operating environment of the listening component includes utilizing a positioning device to detect movement of the mobile computing device.

17. The computer-implemented method of claim 15, wherein detecting the operating environment of the listening component includes utilizing a positioning device to detect a location of the mobile computing device.

18. The computer-implemented method of claim 17, wherein detecting the operating environment of the listening component includes utilizing a WIFI network.

19. The computer-implemented method of claim 18, wherein detecting the operating environment of the listening component includes utilizing a radio frequency identification device.

20. The computer-implemented method of claim 15, wherein transmitting the event information signal includes at least one of: emitting an audible sound from the mobile computing device based on the detected operating environment of the listening component or transmitting the crash/information signal to a central service and/or an emergency service based on the detected operating environment of the listening component.

* * * * *